US011060781B2

(12) United States Patent
Hemrle et al.

(10) Patent No.: US 11,060,781 B2
(45) Date of Patent: Jul. 13, 2021

(54) METHOD AND APPARATUS FOR SOLIDIFYING A POLAR SUBSTANCE

(71) Applicant: ABB Schweiz AG, Baden (CH)

(72) Inventors: Jaroslav Hemrle, Baden-Dättwil (CH); Christos Stamatopoulos, Wettingen (CH); Dimos Poulikakos, Zollikon (CH); Tanmoy Maitra, Zürich (CH)

(73) Assignee: ABB Schweiz AG, Baden (CH)

( * ) Notice: Subject to any disclaimer, the term of this patent is extended or adjusted under 35 U.S.C. 154(b) by 227 days.

(21) Appl. No.: 15/445,199

(22) Filed: Feb. 28, 2017

(65) Prior Publication Data

US 2017/0167770 A1 Jun. 15, 2017

Related U.S. Application Data

(63) Continuation of application No. PCT/EP2015/069669, filed on Aug. 27, 2015.

(30) Foreign Application Priority Data

Aug. 28, 2014 (EP) ..................... 14182663

(51) Int. Cl.
*F25C 1/16* (2006.01)
*F28F 13/04* (2006.01)
(Continued)

(52) U.S. Cl.
CPC ............... *F25C 1/16* (2013.01); *F25D 31/00* (2013.01); *F28D 20/021* (2013.01); *F28F 13/04* (2013.01);
(Continued)

(58) Field of Classification Search
CPC .... F25D 31/00; F25D 11/006; F25D 2303/08; F25D 2317/043; F25C 2301/00;
(Continued)

(56) References Cited

U.S. PATENT DOCUMENTS 3,255,603 A * 6/1966 Johnson .................... F25C 1/16
62/123
3,443,393 A * 5/1969 Goldberg .................. C02F 1/22
62/124
(Continued)

FOREIGN PATENT DOCUMENTS

EP 1431685 A1 6/2004
EP 2236573 A1 10/2010
(Continued)

OTHER PUBLICATIONS

Owen, M.J., Silicone Hydrophobicity and Oleophilicity (Mar. 1, 2014) vol. 9, pp. 651-655. https://doi.org/10.1007/s12633-014-9188-0 (Year: 2014).*

(Continued)

*Primary Examiner* — Jianying C Atkisson
*Assistant Examiner* — Miguel A Diaz
(74) *Attorney, Agent, or Firm* — Taft Stettinius & Hollister LLP

(57) ABSTRACT

A method for solidifying a polar substance, in particular water, is presented which comprises the steps of: providing a coolable, hydrophobic, preferably super-hydrophobic, condensation surface within an interior of a container; partially filling the container with a polar substance, preferably in liquid form, and an immiscible additive, preferably in liquid form, so that the condensation surface remains at least partially unsubmerged; cooling the hydrophobic condensation surface to a temperature $T_{cond}$ below a solidification temperature $T_{solid}$ of the polar substance; and removing solidified polar substance from the container.

25 Claims, 2 Drawing Sheets

(51) Int. Cl.
*F25D 31/00* (2006.01)
*F28D 20/02* (2006.01)

(52) U.S. Cl.
CPC .... *F25C 2301/002* (2013.01); *F25C 2400/02* (2013.01); *F28F 2245/04* (2013.01); *Y02E 60/14* (2013.01)

(58) Field of Classification Search
CPC ....... F25C 2301/002; F25C 1/16; F28F 13/04; F28F 2245/04; Y02E 60/145
See application file for complete search history.

(56) References Cited

U.S. PATENT DOCUMENTS

| | | | | |
|---|---|---|---|---|
| 3,869,870 A * | 3/1975 | Kuehner | ................. | F25C 1/145 165/104.13 |
| 4,694,658 A * | 9/1987 | Juhola | ...................... | C02F 1/16 237/2 B |
| 4,734,116 A | 3/1988 | Ehrsam | | |
| 4,735,641 A * | 4/1988 | Engdahl | .................. | B01D 9/04 62/123 |
| 5,207,073 A * | 5/1993 | Maier-Laxhuber | ..... | F25B 17/08 62/269 |
| 5,598,712 A * | 2/1997 | Watanabe | ............... | F25D 16/00 165/104.17 |
| 5,701,746 A * | 12/1997 | Desgrandchamps | .... | A01N 1/02 62/100 |
| 5,992,169 A * | 11/1999 | Later | .................... | A23B 7/0433 62/100 |
| 6,038,869 A * | 3/2000 | Lee | .......................... | F25C 1/16 62/100 |
| 6,688,117 B1 * | 2/2004 | Ophir | .................... | F04D 29/701 62/74 |
| 6,793,007 B1 * | 9/2004 | Kramer | .................... | C09K 5/10 165/80.4 |
| 9,085,473 B2 * | 7/2015 | Wang | ........................ | C02F 1/22 |
| 2005/0039883 A1 * | 2/2005 | Kramer | .................... | C09K 5/10 165/80.3 |
| 2005/0095476 A1 * | 5/2005 | Schrooten | ............. | F28D 20/025 429/429 |
| 2005/0172659 A1 * | 8/2005 | Barker | ................. | F28D 20/025 62/430 |
| 2007/0056313 A1 * | 3/2007 | Kasza | ................... | A61F 7/0085 62/353 |
| 2008/0072609 A1 * | 3/2008 | Ikeuchi | .................... | F25J 1/004 62/54.1 |
| 2009/0100857 A1 * | 4/2009 | Ophir | ..................... | F25B 30/00 62/347 |
| 2011/0063798 A1 * | 3/2011 | Denter | ............... | H05K 7/20681 361/695 |
| 2014/0000857 A1 * | 1/2014 | King | ....................... | F25B 39/04 165/185 |
| 2014/0147627 A1 * | 5/2014 | Aizenberg | .............. | A61L 15/24 428/141 |
| 2014/0287243 A1 * | 9/2014 | Weber | ..................... | C09D 5/00 428/422 |
| 2015/0048526 A1 * | 2/2015 | Kim | ..................... | B01D 5/0003 261/75 |
| 2015/0083374 A1 * | 3/2015 | Clark, III | ................ | F25D 17/02 165/104.31 |
| 2015/0179321 A1 * | 6/2015 | Khalil | ..................... | H01F 1/442 137/13 |
| 2016/0187065 A1 * | 6/2016 | Muren | .................... | F28C 3/005 165/104.31 |
| 2016/0202172 A1 * | 7/2016 | Guck | ................. | G06K 9/00885 435/34 |
| 2016/0273819 A1 * | 9/2016 | Choi | ........................ | F25C 1/00 |
| 2018/0347881 A1 * | 12/2018 | Henriksson | ............... | F25C 5/20 |

FOREIGN PATENT DOCUMENTS

| | | | | |
|---|---|---|---|---|
| GB | 2485864 A | * | 5/2012 | ............... F25C 1/16 |
| GB | 2485864 A | | 5/2012 | |

OTHER PUBLICATIONS

Atkins, T., & Escudier, M. (2013). condenser. In a Dictionary of Mechanical Engineering. : Oxford University Press,. Retrieved Jun. 12, 2019, from https://www.oxfordreference.com/view/10.1093/acref/9780199587438.001.0001/acref-9780199587438-e-1053. (Year: 2013).*

European Patent Office, International Search Report & Written Opinion issued in corresponding Application No. PCT/EP2015/069669, dated Nov. 10, 2015, 12 pp.

European Patent Office, Extended Search Report issued in corresponding Application No. 14182663.6, dated Mar. 2, 2015, 9 pp.

* cited by examiner

METHOD AND APPARATUS FOR SOLIDIFYING A POLAR SUBSTANCE

FIELD OF THE INVENTION

The present invention relates generally to cooling technology. It relates in particular to an apparatus and a method for solidifying a polar substance according to the preamble of the independent patent claims.

BACKGROUND OF THE INVENTION

Storing thermal energy by means of so called cold storage, e.g. in the form of frozen liquids, in particular ice, is an important and increasingly popular method in energy storage. One major challenge and cost driver, in particular for larger scale applications of ice storage, is an ice generation step.

Vacuum ice generators have been used in commercial ice generation since the 1980s, and allow for energetically efficient ice generation on relatively large scales. As vacuum ice generation takes place at very low pressures, preferably at, at least approximately, 6 mbar, a large and mechanically demanding vacuum system is required. State of the art vacuum ice generators thus include very large vacuum pumps as main compressor, which complicates the system. An exemplary vacuum ice generator comprises a water bath at the bottom of an otherwise evacuated container. The main compressor removes water vapor from a lower part of the container. As heat is also removed alongside with the water vapor pumped away, the water bath eventually reaches the triple point temperature (~0° C.) of water. If water vapor is subsequently continued to be removed, heat removed alongside with the water vapor is compensated for by release of latent heat from the water bath, and ice is thus produced. Commercial installations commonly pump water into such a vacuum ice generator, and pump a so called ice slurry out of the tank, which may be directly used as a very efficient coolant, or stored e.g. in a storage tank, for use at some later time.

On a high pressure side of the main compressor, i.e. in an upper part of the tank, the water vapor removed from the lower part of the tank condenses. Because a pressure of the water vapor was increased by the main compressor, it condenses at a temperature above 0° C. and therefore the condensate has liquid form.

While energetically efficient, vacuum ice generators have some drawbacks. Firstly, a large and complex main compressor is required for the water vapor, even for relatively small thermal duties. Maximum thermal duties have thus been limited to about 500 kWh. Secondly, ice generation needs to take place in a large vacuum container, which is an expensive and mechanically challenging component.

To overcome the problems as laid out above, various compressor-less ice generator designs have been developed.

One technical challenge in designing compressor-less ice generators is that ice tends to adhere to cooling surface, in particular a coolable condensation surface, as soon as said surface is cooled to a temperature below a freezing temperature of water, where said ice effectively isolates the condensation surface thermally from water or water vapor to be cooled for freezing, reducing thermal conductivity and/or heat transfer, and thus slowing down the ice generation, and/or an overall efficiency of the compressor-less ice generator.

In compressor-less vacuum ice generators, which represent a first variant of compressor-less ice generators, the main compressor is removed. Instead, a condenser is placed in an upper part of the container to provide a coolable condensation surface above the water bath for the required removal of heat from the water bath in which ice is to be produced. This, however, requires that a temperature of the condensation surface is below a solidification temperature of water, i.e. below 0° C., so that water vapor condenses or deposits on said condenser. In this manner, heat is removed from the water bath and ice is produced in a similar way as in the device with compressor. However, because the temperature of the condensation surface needs to be below 0° C., ice will eventually form and deposit on the condenser.

There are different strategies to solve this challenge.

One such strategy used for energy efficient large scale energy storage applications is based static ice methods, or ice-on-coil methods, which actually do not attempt to remove the ice from the condensation surface. In this setup, refrigerant circulates or flows through cooling conduits provided inside the condenser; and ice grows statically on the condensation surface. Such systems are relatively energy efficient and are frequently used for various applications, but a power output is limited by the heat exchange and for higher power densities, a capacity factor is significantly reduced. Additionally, the static ice methods require that the ice is consumed at the same location as where it grew, i.e. on the condensation surface. Another strategy widespread in small scale applications to overcome the problem of ice formation on the condensation surface is use of scrapers to remove the ice. Ice generators based on this approach have the inherent problem that a relatively large amount of energy is needed for ice removal, which also reduces the efficiency of such device. Scrapers, however, are often advantageous in applications where aggressive cooling at low footprint is required and energy consumption is secondary, e.g. cooling of fish on fishing boats.

A further strategy to overcome the problem of ice formation is used in energy harvesters, which allow ice growth on the condensation surface, but remove the ice periodically by a short heating cycle. The heating introduces losses into the process, thus reducing overall efficiency. In addition, to allow for efficient removal of ice by periodic heating the only known suitable geometry for the condenser comprises vertical plates on which condensation surfaces is located. As a coolant circulating inside the pipes is typically a refrigerant at relatively high pressure (typically 5-30 bar), said vertical plates are a relatively disadvantageous structure from a mechanical point of view. As a consequence, thick plates are required for mechanical reasons. This reduces thermal performance and increases manufacturing costs of the condenser.

In addition, for optimum efficiency, the water vapor needs to distribute uniformly and reliably in a neighborhood of the condenser, in particular of the vertical plates. To achieve this at near-vacuum conditions present in the container during operation, the vertical plates need to be spaced relatively far apart, which in turn results in relatively large overall dimensions, thus further increasing the size and thus manufacturing costs of the container.

To address the problems of static ice methods as discussed above, so called dynamic ice methods have also been developed in which ice is produced in an ice generator from which it is subsequently pumped or otherwise removed, e.g. dropped, thus forming ice slurry. Yet another strategy to overcome the problem of ice formation is used in so called subcooling ice makers. In this method, water is subcooled in a subcooling heat exchanger to a temperature below 0° C. while avoiding ice nucleation. After water leaves the subcooling heat exchanger, nucleation is triggered (e.g. by ultrasound disturbance) and ice is produced. Disadvantage are a relatively large amount of water which needs to be pumped around with relatively small ice generation fraction; as well as control issues in case unwanted ice nucleation occurs in or on the subcooling heat exchanger.

DESCRIPTION OF THE INVENTION

It is an objective of the invention to provide a method and an apparatus for solidifying a polar substance, in particular water, which overcomes the disadvantages of state of the art solutions as detailed above. This objective is achieved by a method and an apparatus for solidifying a polar substance according to the independent patent claims. Preferred embodiments are evident from the dependent claims.

A method for solidifying a polar substance, in particular water, in accordance with the present invention, comprises the steps of: providing a coolable, hydrophobic, preferably super-hydrophobic, condensation surface within an interior of a container; partially filling the container with a polar substance, preferably in liquid form, and an immiscible additive, preferably in liquid form, so that the condensation surface remains at least partially unsubmerged; cooling the hydrophobic condensation surface to a temperature $T_{cond}$ below a solidification temperature $T_{solid}$ of the polar substance; and removing solidified polar substance from the container.

An apparatus for solidifying a polar substance, in particular water, in accordance with the present invention comprises: a container, said container comprising: a supply volume for containing the polar substance in liquid form, an evaporation volume for retaining evaporated substance from the supply volume, a hydrophobic condensation surface located within the evaporation volume, means for cooling the hydrophobic condensation surface to a temperature $T_{cond}$ below a solidification temperature $T_{solid}$ of the polar substance, and means for removing solidified polar substance from the container, in particular from the supply volume of the container.

If technically possible but not explicitly mentioned, also combinations of variants and embodiments of the invention described in the above and in the following may be embodiments of the method and the system. These and other aspects of the invention will be apparent from and elucidated with reference to the embodiments described hereinafter.

BRIEF DESCRIPTION OF THE DRAWINGS

The subject matter of the invention will be explained in more detail in the following text with reference to preferred exemplary embodiments, which are illustrated in the attached drawings, in which.

For consistency, the same reference numerals are used to denote similar elements illustrated throughout the figures.

DETAILED DESCRIPTION OF PREFERRED EMBODIMENTS

Figure 1:
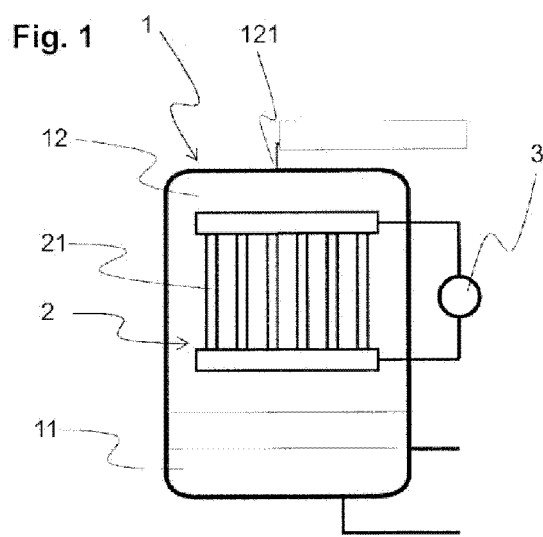
FIG. 1 shows a simplified schematic diagram of an apparatus for solidifying a polar substance in accordance with the present invention.

FIG. 1 shows a simplified schematic diagram of an apparatus for solidifying a polar substance in accordance with the present invention.

The apparatus comprises a container 1, a lower part of which forms a supply volume 11 for retaining an amount of a substance in liquid form, which may in particular comprise the polar substance to be solidified, e.g. water. An upper part of said container 1, on the other hand, serves as an evaporation volume 12 for retaining evaporated substance.

A condenser 2 is arranged in the upper part of the container. Preferably, the condenser is based on a tubular design, i.e. comprises a plurality of tubes 21 or a single tube comprising a plurality of windings, which act as both a cooling conduit through which a refrigerant may be circulated, in particular pumped, during an operation of the apparatus; and as a heat exchange element. The tubular design allows to optimally contain the refrigerant, such as e.g. $CO_2$, ammonia, R245fa, R1234fa or similar, which may reach relatively high pressures (typically in a range of 5-30 bar) during an operation of the apparatus. Preferably, the tubes 21—or straight sections of the windings—may be arranged in inclined manner with angles between 1 to 10° relative to a vertical direction, to accelerate removal of water which condenses on the tubes 21. The tubes 21 may be manufactured from common materials, preferably aluminum, carbon steel or stainless steel.

Alternatively, a plate heat exchanger may be provided in the upper part of the container as condenser. The plate heat exchanger comprises a plurality of vertical cooling plates, in which one or more cooling conduits have been formed, as actual heat exchange element. An outside surface of the vertical cooling plates may be cooled by refrigerant circulating, in particular being pumped, through the cooling conduits of the plate heat exchanger.

A hydrophobic coating is provided on at least a part of an outside surface of the heat exchange element. The hydrophobic coating serves as a hydrophobic condensation surface, which during an operation of the apparatus is in contact with evaporated substance. Preferably, the hydrophobic coating is super-hydrophobic. A hydrophobic property of a material surface, in particular a coating, may e.g. be characterized by a contact angle, i.e. an angle that a liquid surface of a drop of polar liquid, in particular water, forms with the material surface on which the drop resides, wherein the liquid surface is in particular represented by a boundary between the drop and a surrounding atmosphere, in particular air, vapor, or gas. A material surface is, in general, referred to as hydrophobic if the contact angle for polar liquids is larger than 90°; and as super-hydrophobic if said contact angle is larger than 150°. In addition, the hydrophobic coating is preferably oleophilic, most preferably super-oleophilic. A material surface is, in general, referred to as oleophilic if the contact angle for polar liquids is smaller than 90°; and as super-oleophilic if said contact angle is smaller than 1°, preferably, at least approximately, 0°. Further, the hydrophobic coating is preferably made from a material which forms a nanoporous surface.

Exemplary coating materials are FDTS, in particular Perfluorodecyltrichlorosilane, e.g. $C_{10}H_4Cl_3F_{17}Si$, or PDMS, in particular Poly(dimethylsiloxane), e.g. $CH_3[Si(CH_3)_2O]_nSi(CH_3)_3$, or their combinations, which preferably are applied by dip coating and subsequently baked at temperatures between 100° C. and 150° C., preferably at at least approximately 120° C., to form a mechanically stable coating on the heat exchange element. These materials ensure chemical stability with regard to water and volatile additives as will be detailed further below.

A refrigerant cooler 3 is provided as a means for cooling the hydrophobic condensation surface by circulating, in particular pumping, cooled refrigerant through the cooling conduits.

Preferably, the container is closeable, and may in particular be tightly sealed in order to allow for evacuation, in particular of the evaporation volume 12.

Figure 2:
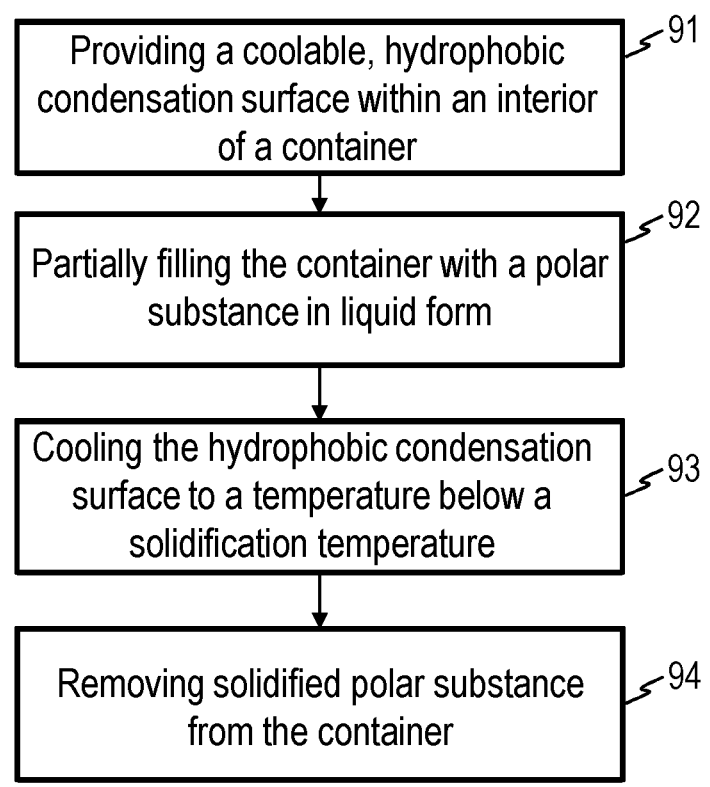
FIG. 2 shows a simplified flow diagram of a method for solidifying a polar substance in accordance with the present invention.

FIG. 2 shows a simplified flow diagram of a method for solidifying a polar substance in accordance with the present invention, which will be explained in detail below with additional reference to FIG. 3.

In a first method step 91, a coolable, hydrophobic, preferably super-hydrophobic, condensation surface is provided within an interior of a container. Preferably, this is achieved by using an apparatus for solidifying a polar substance in accordance with the present invention as described above, by means of which subsequent method steps may preferably be performed as detailed below.

In a subsequent method step 92, the container 1 is partially filled with water, representing a polar substance in liquid form. A volatile additive, preferably HFE7000, HFE7100, R245fa, or a mixture of said substances, said additive being immiscible with water, is added to the water, preferably inside the container 1. Water and volatile, immiscible additive thus form a liquid bath, which at least partially occupies the supply volume 12 in the lower part of the container 1. A fill level of the liquid bath in the tank is controlled to ensure that the heat exchange element remains at least partially, preferably completely, unsubmerged. Preferably, water and the volatile additive are mixed up, preferably repeatedly or continuously, e.g. by a mixer 4 provided in the container 1. A ratio between volatile additive and water, in particular a mass or volume ratio, is preferably chosen between 1:100 and 1:10.

Preferably, air, in particular $N_2$, $O_2$, and $CO_2$, are at least partially evacuated from the container 1 before and/or after the liquid bath is filled into the supply volume 11. This may be done in a manner known as such to a person skilled in the art, e.g. by closing, preferably tightly sealing the container 1, and subsequently evacuating the evaporation volume 12 of the container, in particular from air, e.g. by connecting a vacuum pump 5 to an evacuation inlet 121 or valve leading into said evaporation volume 12, and evacuating the closed container to a pressure below 1 mbar, preferably below 0.1 mbar.

In another, further subsequent method step 93, the hydrophobic condensation surface is cooled to a temperature $T_{cond}$ below a solidification temperature $T_{solid}$, in particular below a triple point temperature $T_{triple}$, of the polar substance, i.e. below a freezing point of water. This is preferably achieved by pumping refrigerant such as e.g. $CO_2$, ammonia, R245fa, R1234fa or similar, at a refrigerant temperature $T_{refr} < T_{solid}$ through cooling conduits of the heat exchange element of the condenser 2.

Water and volatile additive will evaporate from the liquid bath under consumption of thermal energy from said bath, and subsequently begin to condensate on the hydrophobic condensation surface. Water upon condensation forms droplets which rapidly slip away from said surface and drop back into the liquid bath. As condensation of both water and volatile additive transfers thermal energy to the refrigerant, which preferably evaporates subsequently, thermal energy is effectively removed from the container, in particular from the liquid bath, a temperature of which will continuously decrease until a triple point temperature of water is reached. Subsequently, ice will begin to form in the liquid bath if cooling of the hydrophobic condensation surface and thus removal of thermal energy from the liquid bath is continued.

The volatile additives listed above, i.e. HFE7000, HFE7100, and R245fa have a significantly higher vapor pressure than the polar substance of the above example, i.e. water, in particular at the solidification temperature $T_{solid}$ of the polar substance. As a consequence, even if air is evacuated from the container as described above, after partial vaporization of the volatile additive a total pressure $P_{total}$ in the container will result which is significantly higher than a triple point pressure $P_{triple,water} \approx 6$ mbar of water. If the additive or a mix of additives are appropriately chosen, a total pressure $P_{total}$ will result in the container which at least approximately equals an atmospheric pressure $P_{atm}$ present in a surrounding of the container, wherein typically $P_{atm}/5 \leq P_{total} \leq 5 P_{atm}$. This, in turn, will allow to ease requirements with respect to an air tightness of the container. In addition, it will be beneficent to a heat transfer within the container, in particular between the hydrophobic condensation surface and the evaporated water in the evaporation volume, and thus contribute to increasing an overall efficiency.

Due to the hydrophobic and/or oleophilic properties of the hydrophobic condensation surface, an affinity between the volatile additive and said surface is higher than an affinity between the polar substance of the above example, i.e. water, and said surface. As a consequence, the volatile additive tends to rapidly form a coherent film covering the hydrophobic condensation surface, thus subsequently inhibiting water vapor and water to get in contact with said surface. If the hydrophobic condensation surface is also nanoporous, condensed additive tends to fill microscopic pores formed in the hydrophobic condensation surface, so that water upon condensation is even more efficiently hindered from getting in touch with said surface, and is forced to stay on a liquid layer formed by condensed additive.

One effect of a combination of volatile additive and hydrophobic coating is that the hydrophobic condensation surface gets wetted, preferably soaked, with the volatile additive. This is, in particular, owed to the fact that polar substance and volatile additive condense may condense simultaneously at conditions, in particular temperature and pressure, prevailing in container 1; and particularly at the temperature $T_{cond}$ of the hydrophobic condensation surface. In particular, this may be achieved by selecting a volatile additive which has a triple point temperature $T_{triple,add}$ below $T_{cond}$, and a critical temperature $T_{crit,add}$ above $T_{cond}$. A slipperiness of the hydrophobic condensation surface may be measured by an angle difference between an advancing and a receding contact angle when a water droplet moves on the hydrophobic condensation surface. In the present case, angle differences below 10° to 5° have been observed experimentally.

Icing of the hydrophobic condensation surface is thus prevented by a high-droplet-mobility strategy. As long as condensation of water occurs, condensed water droplets having diameters below 1.0 mm, and as small as few tenths of millimeters, move very readily away from the hydrophobic condensation surface before any significant ice nucleation can take place. In experiments, no indication of ice nucleation on the hydrophobic condensation surface could be observed for temperatures $T_{cond}$ of said surface down to and below −8° C. On the other hand, no significant reduction in heat transfer due to the volatile additives as compared to water vapor condensation in absence of additive could be observed.

In a further subsequent method step 94, ice is removed from the container. Preferably, this is achieved by connecting a slurry pump to a slurry outlet 111 provided in the container, and operating said slurry pump to transport a mixture of ice and water out of the container. Preferably, means for limiting an amount of water removed alongside with the ice known as such to a person skilled in the art are provided. For example, the slurry outlet may be located at a height in the container which at least approximately equals the fill level in order to take advantage of gravity effects, i.e. the fact that ice floats on water. Alternatively, other, in particular mechanical, means may be provided to selectively move or concentrate the ice to/in a neighborhood of the slurry outlet. As yet another alternative, water from the slurry may be selectively returned to the container while retaining the ice, e.g. in or by means of a sieve, grid or rake; or by exploiting gravity effects.

Preferably, ice removed from the container 1, in particular slurry pumped out of the container may be transported, in particular piped, to a storage tank 6, where it may be stored for use and/or consumption at some later time.

At least a small amount of volatile additive inevitably leaves the container 1 together with the ice which is removed as described above. Preferably, the additive is selected with a significantly higher density $\rho_{add}$ than a density $\rho_{water}$ of water, preferably $\rho_{add} > 1.5\ \rho_{water}$. The additive may then be separated relatively easily, as it will accumulate near a bottom of a stationary amount of liquid substance, and may be returned to the container 1. In particular, when the ice is stored in a storage tank 6, additive may be recovered through an outlet located at the bottom of said storage tank 6, and returned to the liquid bath in the container, e.g. through a dedicated conduit.

In a preferred variant of the method in accordance with the invention, a miscible additive is added to the polar substance to lower the solidification temperature $T_{solid}$, in particular the triple point temperature $T_{triple}$, of said polar substance. In particular, when water is used as a polar substance as in the above examples, an alcohol, in particular ethanol, glycol, etc., or a salt, in particular NaCl, may be added for this purpose.

Figure 3:
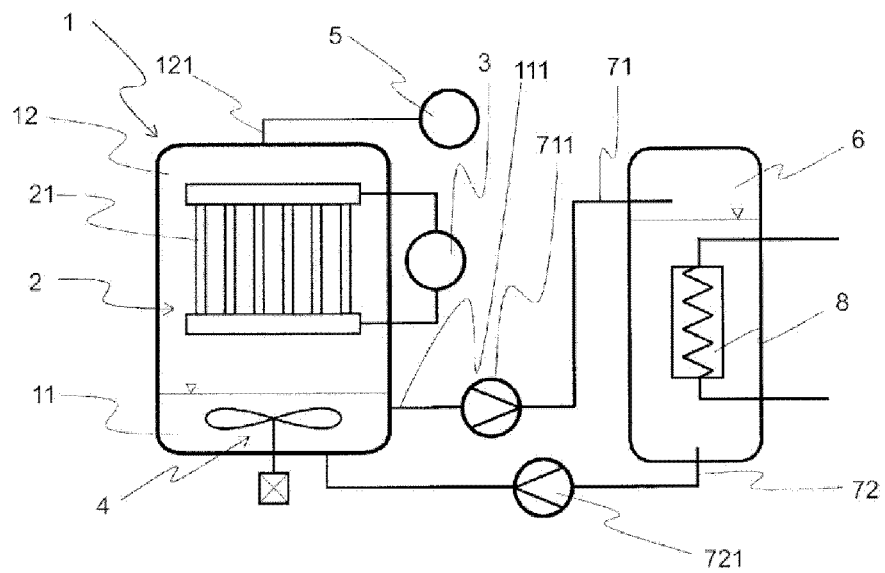
FIG. 3 shows a simplified schematic diagram of a cold thermal storage system in accordance with the present invention.

FIG. 3 shows a simplified schematic diagram of a cold thermal storage system in accordance with the present invention. The system comprises an apparatus for solidifying a polar substance, in particular water, in accordance with the present invention as described above. The container 1 of said apparatus is at least partially filled with polar substance in liquid form, in particular water, to which a volatile additive as described above has been added; said volatile additive being, in particular, immiscible with the polar substance in liquid form, and may in particular be a non-polar substance in liquid form. A ratio between volatile, immiscible additive and water in the container 1, in particular a mass or volume ratio, is preferably set between 1:100 and 1:10.

A storage tank 6 for storing solidified polar substance removed from the container of the apparatus is connected to the container 1 by means of a slurry conduit 71, which in turn is connected to a slurry outlet 111 of the container 1. A slurry pump 711 is provided in the slurry conduit 71 for pumping a slurry comprising substance in both liquid and solid form into said storage tank 6. A re-flow conduit 72, preferably comprising a re-flow pump 721, connects a re-flow outlet located at the bottom of the storage tank 6 to a re-flow inlet in the container 1, and allows for returning polar substance in liquid form, and/or volatile additive to the supply volume 11 of the container 1. A heat exchanger 8 located inside the storage tank 6 serves as an exemplary heat transfer means for transferring thermal energy to solidified polar substance contained in the storage tank 6, for example by circulating heated cooling fluid from an indirect cooling circuit for cooling, e.g., an industrial process; a thermodynamic machine, in particular a motor; or from electric machinery, in particular a generator, transformer, inverter; etc., thus cooling said heated cooling fluid so it may be returned to the indirect cooling circuit.

Additionally or alternatively, the heat transfer means may comprise means for removing solid and/or liquid polar substance from the storage tank 6. In particular, liquid polar substance may be used to feed a direct cooling circuit, e.g. for cooling e.g., an industrial process; a thermodynamic machine, in particular a motor; or an electric machinery, in particular a generator, transformer, inverter; etc. As at least a small amount of volatile additive will generally be removed from the storage tank 6 alongside with solid and/or liquid polar substance which is removed as described above, a closed circuit design is preferably chosen for the direct cooling circuit, as otherwise volatile additive would be lost, which would increase operating cost and—depending on the exact type of volatile additive chosen—may have negative impact on an environment.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the description above and in the patent claims below, the term "comprising" does not exclude other elements or steps, and the indefinite article "a" or "an" does not exclude a plurality. The mere fact that certain features are recited in mutually different dependent patent claims does not indicate that a combination of these features cannot be used to advantage. Any reference signs in the patent claims should not be construed as limiting the scope.

Embodiments of the present invention, in particular as described above, may be realized as detailed in the items listed below, advantageously in combination with one or more of the features as detailed above:

1) A method for solidifying a polar substance, in particular water, the method comprising the steps of
   a) providing a coolable, hydrophobic, preferably super-hydrophobic, condensation surface within an interior of a container (1),
   b) partially filling the container with
      i) a polar substance, preferably in liquid form, and
      ii) an immiscible additive, preferably in liquid form,
      iii) so that the condensation surface remains at least partially unsubmerged,
   c) cooling the hydrophobic condensation surface to a temperature $T_{cond}$ below a solidification temperature $T_{solid}$ of the polar substance,
   d) removing solidified polar substance from the container.
2) The method according to item 1, characterized in that, at the solidification temperature $T_{solid}$ of the polar substance, the immiscible additive is volatile, in particular having a higher vapor pressure than the polar substance.
3) The method according to item 1 or 2, characterized in that the immiscible additive has a lower triple point temperature $T_{triple,add}$ than the temperature $T_{cond}$ of the hydrophobic condensation surface, preferably $T_{triple,add} < T_{solid}$.

4) The method according to one of items 1 to 3, characterized in that the immiscible additive is condensable at the solidification temperature $T_{solid}$ of the polar substance; in particular that it has a critical temperature $T_{crit,add}$ higher than the solidification temperature $T_{solid}$ of the polar liquid.

5) The method according to one of items 1 through 4, further comprising the steps of
   a) closing the container, and subsequently
   b) evacuating air from the container, in particular after step b) of item 1.

6) The method according to one of items 1 through 5, further characterized in that the hydrophobic condensation surface provided in item 1 is oleophilic, preferably super-oleophilic.

7) The method according to one of items 1 through 6, further characterized in that the hydrophobic condensation surface is nanoporous.

8) The method according to one of items 1 through 7, further characterized in that the hydrophobic condensation surface comprises a coating comprising FDTS, in particular Perfluorodecyltrichlorosilane, preferably $C_{10}H_4Cl_3F_{17}Si$; or a combination of FDTS with PDMS, in particular poly(dimethylsiloxane), preferably $CH_3[Si(CH_3)_2O]_nSi(CH_3)_3$; preferably formed on an aluminum surface.

9) The method according to one of items 1 through 8, further characterized in that the immiscible additive added in step c) of item 1 is a hydro-fluoro-ether; in particular in that the additive comprises HFE1700 and/or Rf245fa.

10) The method according to one of items 1 through 9, further comprising the step of mixing the polar substance with a miscible additive to lower the solidification temperature $T_{solid}$ of said polar substance; in particular with an alcohol, preferably ethanol, glycol, etc., or with a salt, preferably NaCl.

11) An apparatus for solidifying a polar substance, in particular water, the apparatus comprising
   a) a container (1), said container comprising
      i) a supply volume (11) for containing the polar substance in liquid form,
      ii) an evaporation volume (12) for retaining evaporated substance from the supply volume,
      iii) a hydrophobic condensation surface located within the evaporation volume,
   b) means for cooling the hydrophobic condensation surface to a temperature $T_{cond}$ below a solidification temperature $T_{solid}$ of the polar substance,
   c) means for removing solidified polar substance from the container, in particular from the supply volume of the container.

12) The apparatus of item 11, characterized in that the means for removing solidified polar substance comprise a slurry pump.

13) The apparatus of items 11 or 12, characterized in that the hydrophobic condensation surface is provided on a condenser located above the supply volume in the evaporation volume.

14) The apparatus according to one of items 11 through 13, further characterized in that the hydrophobic condensation surface provided in item 1 is oleophilic, preferably super-oleophilic.

15) The apparatus according to one of items 11 to 14, further characterized in that the hydrophobic condensation surface is nanoporous.

16) A cold thermal storage system comprising
   a) an apparatus according to one of items 11 to 15, a supply volume (11) of which is at least partially filled with polar substance, preferably in liquid form,
   b) a storage tank (6) for storing solidified polar substance removed from the container (1) of the apparatus,
   c) transport means for transporting solidified polar substance removed from the container to the storage tank,
   d) heat transfer means for transferring thermal energy to solidified polar substance from or contained in the storage tank for at least partially liquifying said solidified polar substance, wherein)
   e) the supply volume (11) further contains an immiscible additive, said additive being immiscible with the polar substance; said additive in particular being a non-polar substance in liquid form.

17) The cold thermal storage system according to item 16, further comprising conduit means (72, 721) for re-flowing liquified polar substance to the supply volume (11).

18) The cold thermal storage system according to item 16 or 17, characterized in that the heat transfer means comprise a heat exchanger (8) located within the storage means, said heat exchanger being adapted to transfer heat from a cooling fluid to solidified polar substance contained in the storage tank.

19) The cold thermal storage arrangement according to one of items 16 through 18, characterized in that air is evacuated from the container; in particular that a partial pressure of each $N_2$, $O_2$ and $CO_2$ in the evaporation volume is smaller than 10 mbar.

20) The cold thermal storage arrangement according to one of items 16 through 19, characterized in that, at the solidification temperature $T_{solid}$ of the polar substance, the immiscible additive is volatile, in particular having a higher vapor pressure than the polar substance.

21) The cold thermal storage arrangement according to one of items 16 through 20, characterized in that the immiscible additive has a lower triple point temperature $T_{triple,add}$ than the temperature $T_{cond}$ of the hydrophobic condensation surface, preferably $T_{tripple,add} < T_{solid}$.

22) The cold thermal storage arrangement according to one of items 16 through 21, characterized in that the immiscible additive is condensable at the solidification temperature $T_{solid}$ of the polar substance; in particular that it has a critical temperature $T_{crit,add}$ higher than the solidification temperature $T_{solid}$ of the polar liquid.

23) The cold thermal storage arrangement according to one of items 16 through 22, characterized in that the hydrophobic condensation surface is oleophilic, preferably super-oleophilic.

24) The cold thermal storage arrangement according to one of items 16 through 23, characterized in that the hydrophobic condensation surface is nanoporous.

25) The cold thermal storage arrangement according to one of items 16 through 24, further characterized in that the hydrophobic condensation surface comprises a coating comprising FDTS, in particular Perfluorodecyltrichlorosilane, preferably $C_{10}H_4Cl_3F_{17}Si$; or a combination of FDTS with PDMS, in particular poly(dimethylsiloxane), preferably $CH_3[Si(CH_3)_2O]_nSi(CH_3)_3$; preferably formed on an aluminum surface.

26) The cold thermal storage arrangement according to one of items 16 through 25, further characterized in that the immiscible additive is a hydro-fluoro-ether; in particular in that the additive comprises HFE1700 and/or Rf245fa.

27) The cold thermal storage arrangement according to one of items 16 through 26, wherein the polar substance comprises a miscible additive to lower the solidification temperature $T_{solid}$ of said polar substance, in particular with an alcohol, preferably ethanol, glycol, etc., or with a salt, preferably NaCl.

LIST OF REFERENCE SYMBOLS 1 container
11 supply volume
12 evaporation volume
111 slurry outlet
121 vacuum outlet
2 condenser
21 tubes
3 refrigerant cooler
4 mixer
5 vacuum pump
6 storage tank
71 slurry conduit
711 slurry pump
72 re-flow conduit
721 re-flow pump
8 heat exchanger

The invention claimed is:

1. A method for solidifying a polar substance, comprising the steps of
   a) providing a cooler with a hydrophobic condensation surface located thereon, the hydrophobic condensation surface being within an interior of a container,
   b) partially filling the container with
      i) a polar substance, and
      ii) an immiscible additive,
      iii) so that the condensation surface remains at least partially unsubmerged,
   c) cooling an unsubmerged portion of the hydrophobic condensation surface with the cooler to a temperature $T_{cond}$ below a solidification temperature $T_{solid}$ of the polar substance, wherein $T_{cond}$ is $-8°$ C. or below,
   d) removing solidified polar substance from the container; wherein
   e) at the solidification temperature $T_{solid}$ of the polar substance, the immiscible additive is volatile.

2. The method according to claim 1, wherein at the solidification temperature $T_{solid}$ of the polar substance, the immiscible additive has a higher vapor pressure than the polar substance.

3. The method according to claim 1, further comprising the steps of
   a) closing the container, and subsequently
   b) evacuating air from the container.

4. The method according to claim 1, wherein the polar substance is water;
   wherein the hydrophobic condensation surface is super hydrophobic; and
   wherein the immiscible additive is in liquid form.

5. The method according to claim 1, wherein the hydrophobic condensation surface is provided on a plurality of tubes arranged within the interior of the container.

6. An apparatus for solidifying a polar substance, comprising
   a) a container, said container comprising
      i) a supply volume for containing the polar substance in liquid form,
      ii) an evaporation volume for retaining evaporated substance from the supply volume,
      iii) a hydrophobic condensation surface located on a cooler within the evaporation volume,
   b) the cooler cooling an unsubmerged portion of the hydrophobic condensation surface to a temperature $T_{cond}$ below a solidification temperature $T_{solid}$ of the polar substance, wherein $T_{cond}$ is $-8°$ C. or below,
   c) a removal arrangement for removing solidified polar substance from the container,
   d) wherein the hydrophobic condensation surface is oleophilic.

7. The apparatus according to claim 6, wherein the hydrophobic condensation surface comprises a coating comprising FDTS or a combination of FDTS with PDMS.

8. The apparatus according to claim 6, wherein the removal arrangement for removing solidified polar substance comprise a slurry pump.

9. The apparatus according to claim 6, wherein the cooler comprises a heat exchanger, the hydrophobic condensation surface is provided on the heat exchanger located above the supply volume in the evaporation volume.

10. The apparatus according to claim 6, wherein the removal arrangement is operable for removing from the supply volume of the container;
    wherein the polar substance is water; and
    wherein the hydrophobic condensation surface is super-oleophilic.

11. The apparatus according to claim 6, wherein the hydrophobic condensation surface is provided on a plurality of tubes located within the evaporation volume.

12. A cold thermal storage system comprising
    a) an apparatus according to claim 6 for solidifying a polar substance,
    b) a storage tank for storing solidified polar substance removed from the container of the apparatus,
    c) a transport arrangement for transporting solidified polar substance removed from the container to the storage tank,
    d) a heat exchanger for transferring thermal energy to solidified polar substance from or contained in the storage tank for at least partially liquifying said solidified polar substance,
    e) wherein the supply volume further contains an immiscible additive, said additive being immiscible with the polar substance.

13. The cold thermal storage system according to claim 12, further comprising at least one conduit for re-flowing liquified polar substance to the supply volume.

14. The cold thermal storage system according to claim 12, wherein the heat exchanger is located within the storage tank, said heat exchanger being adapted to transfer heat from a cooling fluid to solidified polar substance contained in the storage tank.

15. The cold thermal storage system according to claim 12, wherein air is evacuated from the container, the air having a partial pressure of each of $N_2$, $O_2$, and $CO_2$ in the evaporation volume smaller than 10 mbar.

16. The cold thermal storage system according to claim 12, wherein the hydrophobic condensation surface is provided on an external surface of at least one tube.

17. The cold thermal storage system according to claim 12, wherein the additive is a non-polar substance in liquid form.

18. The cold thermal storage system according to claim 12, wherein at the solidification temperature $T_{solid}$ of the polar substance, the immiscible additive is volatile.

19. The cold thermal storage system of claim 18, wherein the immiscible additive having a higher vapor pressure than the polar substance.

20. The cold thermal storage system according to claim 12, wherein the immiscible additive has a lower triple point temperature $T_{triple,\ add}$ than the temperature $T_{cond}$ of the hydrophobic condensation surface.

21. The cold thermal storage system according to claim 20, wherein the hydrophobic condensation surface is provided on an external surface of at least one tube.

22. The cold thermal storage system according to claim 12, wherein the immiscible additive added is a hydro-fluoro-ether.

23. The cold thermal storage thermal system according to claim 22, wherein the immiscible additive comprises HFE1700 and/or Rf245fa.

24. The cold thermal storage system according to claim 12, wherein the polar substance is mixed with a miscible additive to lower the solidification temperature $T_{solid}$ of said polar substance.

25. The cold thermal storage system according to claim 24, wherein the miscible additive to lower the solidification temperature $T_{solid}$ of said polar substance is one of an alcohol or a salt.

* * * * *